United States Patent
Xu et al.

(10) Patent No.: US 8,675,516 B2
(45) Date of Patent: Mar. 18, 2014

(54) METHOD AND DEVICE FOR CONFIGURING AND SENDING DOWNLINK CSI REFERENCE SIGNAL

(75) Inventors: Jing Xu, Beijing (CN); Deshan Miao, Beijing (CN); Jun Chen, Beijing (CN); Guojun Xiao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 147 days.

(21) Appl. No.: 13/320,516

(22) PCT Filed: May 13, 2010

(86) PCT No.: PCT/CN2010/072707
§ 371 (c)(1),
(2), (4) Date: Jan. 27, 2012

(87) PCT Pub. No.: WO2010/130209
PCT Pub. Date: Nov. 18, 2010

(65) Prior Publication Data
US 2012/0113852 A1 May 10, 2012

(30) Foreign Application Priority Data
May 14, 2009 (CN) .......................... 2009 1 0084458

(51) Int. Cl.
*H04L 12/26* (2006.01)
(52) U.S. Cl.
USPC ........................................ 370/252; 370/329

(58) Field of Classification Search
USPC ......... 370/329, 330, 331, 332, 252, 253, 229, 370/230
See application file for complete search history.

(56) References Cited

U.S. PATENT DOCUMENTS

2008/0205364 A1   8/2008 Park et al.
2011/0317641 A1* 12/2011 Noh et al. ..................... 370/329

FOREIGN PATENT DOCUMENTS

| CN | 101286762 A | 10/2008 |
| CN | 101299871 A | 11/2008 |
| CN | 101383639 A | 3/2009 |
| CN | 101389120 A | 3/2009 |

OTHER PUBLICATIONS

ISA China, International Search Report of PCT/CN2010/072707, Oct. 17, 2006, WIPO, 4 pages.

* cited by examiner

*Primary Examiner* — Dady Chery
(74) *Attorney, Agent, or Firm* — Alleman Hall McCoy Russell & Tuttle LLP

(57) ABSTRACT

A method for configuring and sending a downlink CSI reference signal is provided. The method comprises: an eNB configures the downlink CSI reference signal and sends configuration information of the downlink CSI reference signal to a UE, wherein the configuration information comprises a starting subframe number and/or a cycle of the downlink CSI reference signal; the eNB sends the downlink CSI reference signal to the UE according to the configuration information of the downlink CSI reference signal.

16 Claims, 8 Drawing Sheets

S502 — a UE receives configuration information of a downlink CSI reference signal from an eNB S504 — the UE obtains the downlink CSI reference signal according to the configuration information and performs channel measurements.

METHOD AND DEVICE FOR CONFIGURING AND SENDING DOWNLINK CSI REFERENCE SIGNAL

CROSS REFERENCE TO RELATED APPLICATIONS

The present application is the national phase of International Patent Application No. PCT/CN2010/072707, entitled METHOD AND APPARATUS FOR CONFIGURING AND SENDING DOWNLINK MEASUREMENT PILOT FREQUENCY, filed May 13, 2010, which in turn claims priority to Chinese Patent Application No. 200910084458.9 filed May 14, 2009, the entire contents of which are incorporated herein by reference for all purposes.

FIELD OF THE INVENTION

The invention relates to a field of communication technology, and in particular to a method and a device for configuring and sending downlink CSI reference signal, as well as to a method and a device for receiving and measuring downlink CSI reference signal.

BACKGROUND OF THE INVENTION

In a radio communication system, pilot signals are sent for channel estimations and channel measurements during a data transmission. With the application of MIMO technique in the radio communication system, it is necessary to further identify different spatial channels so as to achieve spatial selectivity. Therefore, a plurality of orthogonal pilots is sent for identifying a respective spatial channel. With the technical development, the more antennae a transceiver uses, the more pilots are needed. In a LTE system, pilots of various antenna ports are configured as full-band and the pilots are sent at each sub-frame so as to achieve channel estimations and channel measurements.

However, in the LTE-A system, the number of antenna ports supported by downlink increases to eight. In order to limit the pilots, the downlink pilots are classified as CSI reference signal and demodulation pilots in SI phase, The demodulation pilots are user-specific, which are stream-based structures, while the CSI reference signal are neighborhood-specific, which sparse distributed in the frequency domain based on the structures of the antenna port. However, the prior arts failed to involve any solution for sending the downlink CSI reference signal currently.

SUMMARY OF THE INVENTION

The invention aims to overcome at least one of the above technical defects. Particularly, the present invention could solve the problem on how to send downlink CSI reference signal in the prior.

In order to achieve the above object, a method for configuring and sending a downlink CSI reference signal is provided according to embodiments of the present invention. The method comprises the following steps: an eNB configures the downlink CSI reference signal and sends configuration information of the downlink CSI reference signal to a user equipment (UE), wherein the configuration information comprises a starting subframe number and/or a cycle of the downlink CSI reference signal; the eNB sends the downlink CSI reference signal to the UE according to the configuration information of the downlink CSI reference signal.

Furthermore, a device for configuring and sending is proposed according to embodiments of the present invention, the device comprises a configuring module and a sending module, wherein the configuring module is used by an eNB for configuring a downlink CSI reference signal; and the sending module is used for sending configuration information of the downlink CSI reference signal to a UE, wherein the configuration information comprises a starting subframe number and/or a cycle of the downlink CSI reference signal.

In addition, a method for receiving and measuring is provided according to embodiments of the present invention, the method comprises: a UE receives configuration information of a downlink CSI reference signal from an eNB, wherein the configuration information comprises a starting subframe number and/or a cycle of the downlink CSI reference signal; and the UE obtains the downlink CSI reference signal according to the configuration information and performs a channel measurement.

In addition, a device for receiving and measuring is provided according to embodiments of the present invention, the device comprises a receiving module and a measuring module, wherein the receiving module is used for receiving the configuration information of the downlink CSI reference signal from the eNB, wherein the configuration information comprises a starting subframe number and/or a cycle of the downlink CSI reference signal; and the measuring module is used for obtaining the downlink CSI reference signal according to the configuration information and performing a channel measurement.

The present invention proposes a method for configuring and sending the downlink CSI reference signal in the LTE-A system, and achieves a flexible configuration of the downlink CSI reference signal according to operating requirements of the system, so that not only the pilot expense is reduced, but also an influence of the downlink CSI reference signal on a R8 user is reduced.

The additional aspects and advantages of the present invention will be given in the following description and part of them become apparent from the following description or understandable through the embodiments of the present invention.

BRIEF DESCRIPTION OF THE DRAWINGS

The above and/or additional aspects and advantages of the present invention will become apparent and easily understandable in the following description of the embodiments in conjunction with the accompanying drawings, in which.

DETAILED DESCRIPTION OF THE PRESENT INVENTION

The embodiments of the present invention are described in detail in the following, and all examples of the embodiments are shown in the accompanying drawings, wherein the same or similar reference numbers represent the same or similar elements or elements having same or similar function throughout. The embodiments will be described as examples with reference to the accompanying drawings in the following and are only used for explaining, rather than being construed as limiting the present invention.

The present invention mainly aims to achieve a flexible configuration of the downlink CSI reference signal according to operating requirements of the system, so that not only the pilot expense is reduced, but also an influence of the downlink CSI reference signal on a R8 user is reduced.

Figure 1:
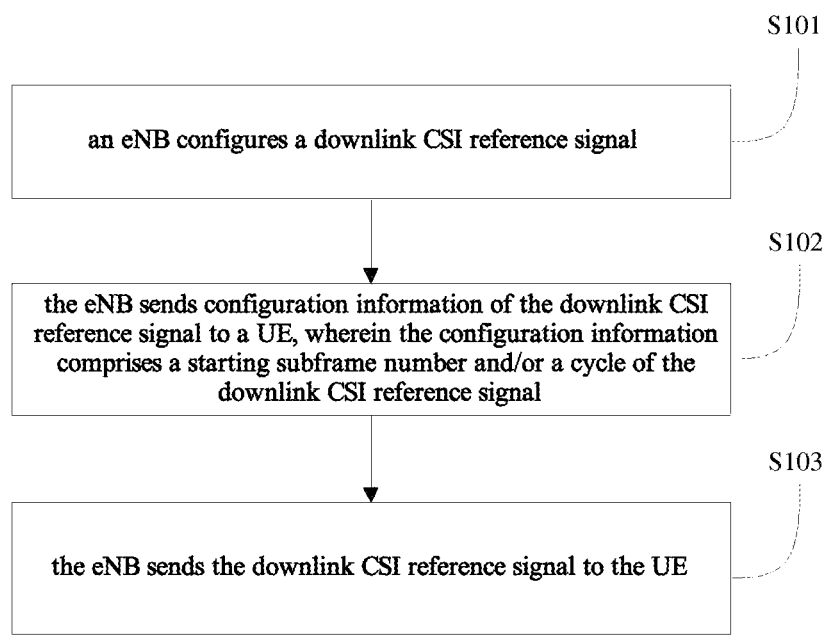
FIG. 1 is a flow chart showing a method for configuring and sending a downlink CSI reference signal according to an embodiment of the present invention.

FIG. 1 is a flow chart showing a method for configuring and sending a downlink CSI reference signal according to an embodiment of the present invention, the method comprises the following steps:

Step S101, an eNB configures a downlink CSI reference signal, wherein a cycle of the downlink CSI reference signal of the eNB may be different from that of the downlink CSI reference signal of other eNBs, thus the cycle should be determined according to conditions of the eNB, such as configurations of antenna ports or measurement requirements etc.

For example, the eNB, which have different antenna port configurations, may configure different cycles of the downlink CSI reference signal. For higher antenna port configuration (e.g., the number of the antenna ports is more than or equal to 4), a shorter cycle of the downlink CSI reference signal can be configured. For lower antenna port configuration, a longer cycle of the downlink CSI reference signal can be configured.

The above is a general description of how to configure the downlink CSI reference signal, which will be explained in detail with specific embodiments in the following:

Embodiment one: a cycle of downlink CSI reference signal of an eNB can be determined according to an antenna port configuration.

Figure 2A:
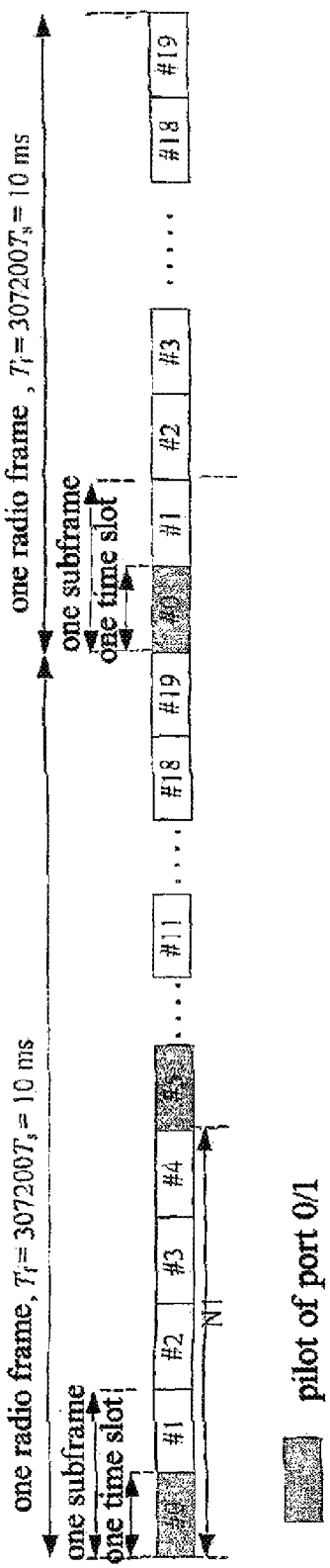
FIGS. 2A to 2C are schematic diagrams showing cycle configurations of downlink CSI reference signal according to one embodiment of the present invention.
Figure 2B:
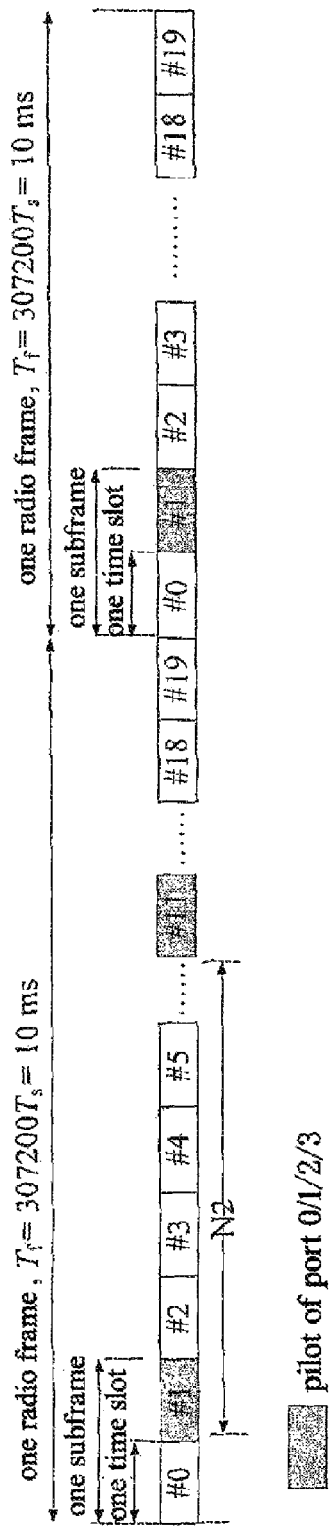
Figure 2C:
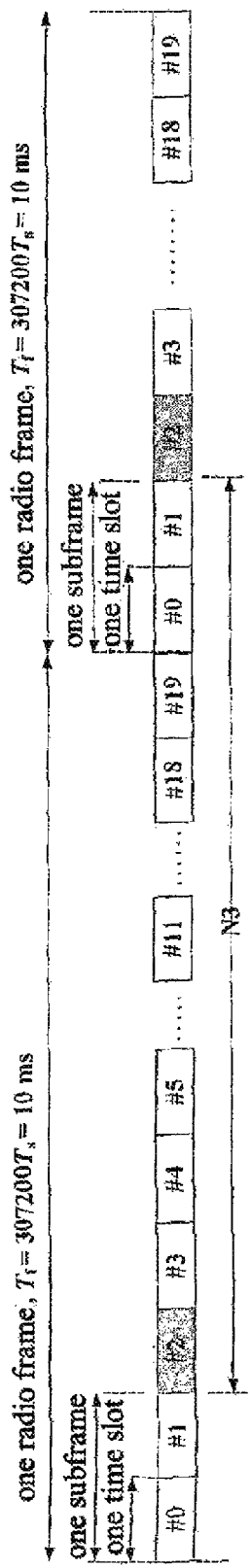

FIGS. 2A to 2C are schematic diagrams showing cycle configurations of downlink CSI reference signal according to one embodiment of the present invention. As shown in FIGS. 2A to 2C, for example, when the number of the antenna ports is 1 or 2, the cycle of the downlink CSI reference signal is N1. When the number of the antenna ports is 4, the cycle of the downlink CSI reference signal is N2. When the number of the antenna ports is 8, the cycle of the downlink CSI reference signal is N3. As shown in FIGS. 2A to 2C, relations of N1, N2 and N3 may be N3≥N2≥N1. However, FIGS. 2A to 2C are only schematic diagrams. If the antenna port configurations are different, the cycles of the downlink CSI reference signal are different. Other antenna port configurations are similar and will not be described again.

Figure 3:
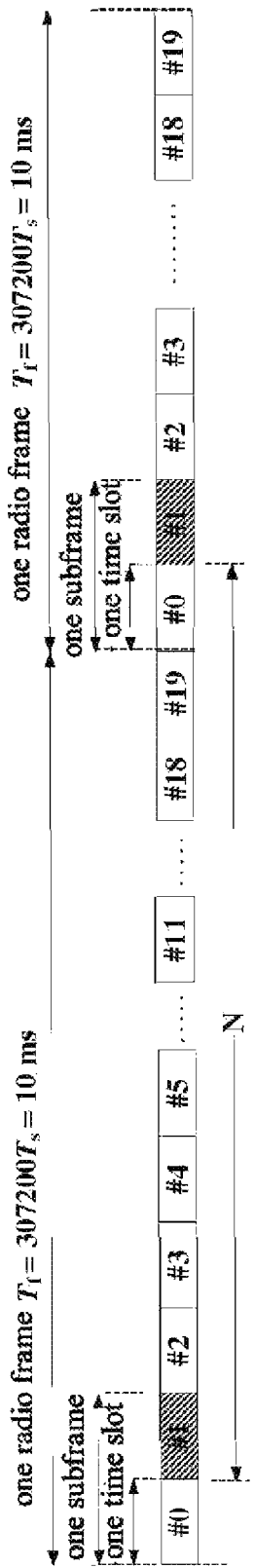
FIG. 3 is a schematic diagram showing a starting subframe configuration of a downlink CSI reference signal according to an embodiment of the present invention.

Embodiment two: a cycle of a downlink CSI reference signal can be configured according to measurement requirements of a UE in a neighborhood. The cycle of the downlink CSI reference signal is usually adjusted based on the statistic information of the UE channels in the neighborhood, particularly moving speed. FIG. 3 is a schematic diagram showing a cycle configuration of the downlink CSI reference signal according to one embodiment of the present invention. For example, when average moving speed of the UE in the neighborhood is more than 200 km/h, the cycle N of the downlink CSI reference signal is N1. When the average moving speed of the UE in the neighborhood is less than 200 km/h and more than 20 km/h, the cycle N of the downlink CSI reference signal is N2. When the average moving speed of the UE in the neighborhood is less than 20 km/h, the cycle N of the downlink CSI reference signal is N3. As shown in FIG. 3, relations of N1, N2 and N3 may be N3≥N2≥N1. However, FIG. 3 is only a schematic diagram. If the measurement requirements of the UE in the neighborhood are different, the cycle of the downlink CSI reference signal is different. Other measurement requirements of the UE in the neighborhood are similar and, which thereby will not be described in detail again.

In the above two embodiments, the configured cycle of the downlink CSI reference signal is neighborhood-specific. In addition, the cycle of the downlink CSI reference signal may be configurable. That is, for a configuration mode of an antenna port, a number of (N) values are available for selection to configure the cycle of the downlink CSI reference signal, one of which is selected according to the specific situation. Alternatively, the cycle of the downlink CSI reference signal may be a default. That is, the cycle of the downlink CSI reference signal is a predetermined value, which can be unique or is in correspondence with the antenna port configuration. The cycle of the downlink CSI reference signal may be variable according to the different specific situations. Alternatively, the cycle of the downlink CSI reference signal may be fixed.

In addition, downlink CSI reference signal of all ports may correspond to an identical starting subframe number.

It should be explained that, both in the embodiment one and two, downlink CSI reference signal of all ports may correspond to an identical starting subframe number, which is neighborhood-specific. Furthermore, the starting subframe number of the downlink CSI reference signal may be configurable. That is, for respective ports, respective groups of ports or respective neighborhood, N values are available for selection for the cycle of the downlink CSI reference signal. Alternatively, the cycle of the downlink CSI reference signal may be a default. That is, a neighborhood ID and/or duplex mode etc. is in correspondence with the starting subframe number of the downlink CSI reference signal.

Moreover, in the above embodiments, the configurations of the cycle and the starting subframe number of the downlink CSI reference signal should be prevented from being run into channels such as PBCH/P-SCH/S-SCH etc.

Step S102, the eNB sends the configuration information of the downlink CSI reference signal to the UE, wherein the configuration information comprises the starting subframe number and/or the cycle of the downlink CSI reference signal.

In this embodiment, the configuration information can be sent to UE via broadcast or high level signalling. As one embodiment of the present invention, the configuration information of the downlink CSI reference signal can be sent to UE with signalling which identifies the starting subframe number and/or the cycle of the downlink CSI reference signal in a combined or separate manner. That is, the starting subframe and/or the cycle of the downlink CSI reference signal are identified as a combined code. Alternatively, signalling is set to indicate the starting subframe and/or the cycle of the downlink CSI reference signal respectively.

Step S103, the eNB sends the downlink CSI reference signal to the UE according to the configuration information of the downlink CSI reference signal, and then the UE performs the channel measurement based on the configuration information of the downlink CSI reference signal and feedback the channel state information (such as CSI, CQI/PMI/RI). The channel state information of one port is considered as constant in the pilot configuration cycle.

Figure 4:
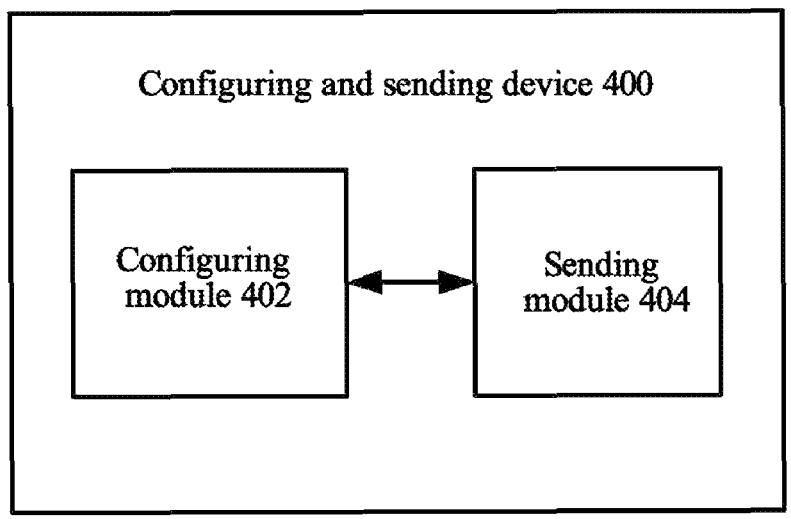
FIG. 4 is structural diagram showing a device for configuring and sending according to an embodiment of the present invention.

FIG. 4 is structural diagram showing a device for configuring and sending according to an embodiment of the present invention. As shown in FIG. 4, the device for configuring and sending 400 is located at eNB side, which comprises a configuring module 402 and a sending module 404, wherein the configuring module 402 is used for configuring a downlink CSI reference signal, which comprises a starting subframe number and/or a cycle of the downlink CSI reference signal, and the cycle of the downlink CSI reference signal is determined based on conditions of the eNB, such as configuration conditions of antenna ports or measurement requirements of UE in a neighborhood etc.; the sending module 404 is configured for sending the configuration information of the downlink CSI reference signal to the UE, wherein the configuration information comprises the starting subframe number and/or the cycle of the downlink CSI reference signal.

In one embodiment of the present invention, the configuring module 402 determines the cycle of the downlink CSI reference signal based on the antenna port configuration of the eNB, wherein different antenna port configurations correspond to different cycles of the downlink CSI reference signal.

In another embodiment of the present invention, the configuring module 402 determines the cycle of the downlink CSI reference signal based on the measurement requirements of the UE in the neighborhood.

In the above embodiments, the cycle of the downlink CSI reference signal may be cell-specific. In addition, the cycle of the downlink CSI reference signal is configurable or fixed.

In another embodiment of the present invention, the configuring module 402 determines the starting subframe number of the downlink CSI reference signal based on the antenna port configuration of the eNB, wherein the downlink CSI reference signal of all ports may correspond to an identical starting subframe number. In this embodiment, the starting subframe number of the downlink CSI reference signal is neighborhood-specific. In addition, the starting subframe number of the downlink CSI reference signal is configurable or fixed.

In another embodiment of the present invention, the sending module 404 sends the configuration information of the downlink CSI reference signal to UE with signalling which identifies the starting subframe number and/or the cycle of the downlink CSI reference signal in a combined or separate manner.

Figure 5:
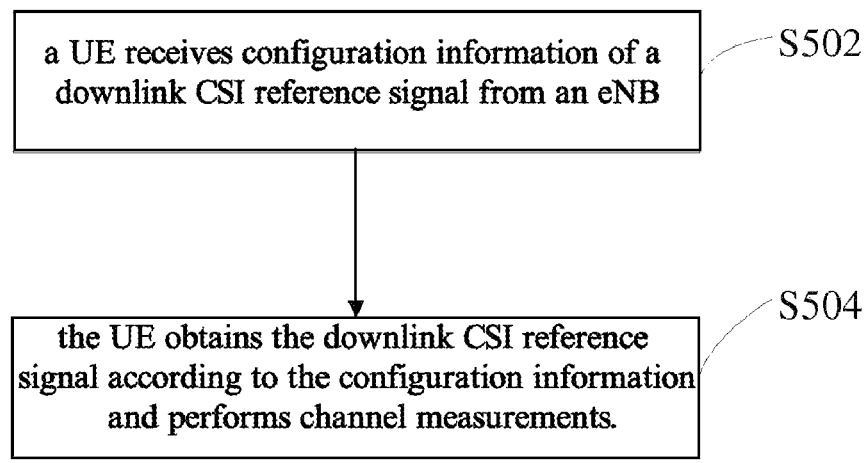
FIG. 5 is a flow chart showing a method for receiving and measuring according to an embodiment of the present invention.

FIG. 5 is a flow chart showing a method for receiving and measuring according to an embodiment of the present invention. As shown in FIG. 5, the method for receiving and measuring comprises the following steps:

S502, a UE receives configuration information of a downlink CSI reference signal from an eNB, wherein the configuration information comprises a starting subframe number and/or a cycle of the downlink CSI reference signal; and S504, the UE obtains the downlink CSI reference signal according to the configuration information and performs channel measurements.

Figure 6:
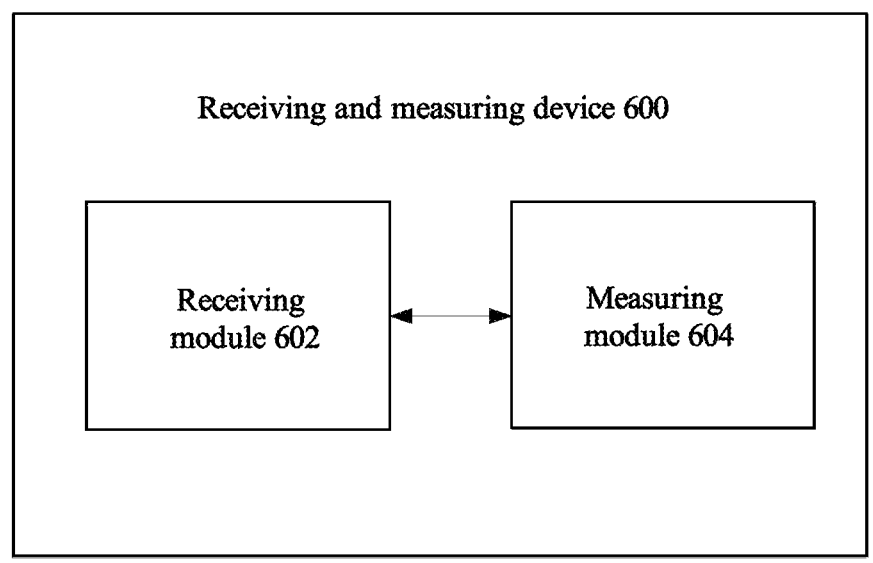
FIG. 6 is schematic diagram showing a device for receiving and measuring according to an embodiment of the present invention.

FIG. 6 is schematic diagram showing a device for receiving and measuring according to an embodiment of the present invention. As shown in FIG. 6, the device 600 for receiving and measuring is located at UE side and comprises:

a receiving module 602, which is configured for receiving configuration information of a downlink CSI reference signal from an eNB, wherein the configuration information comprises a starting subframe number and/or a cycle of the downlink CSI reference signal; and a measuring module 604, which is used for obtaining the downlink CSI reference signal according to the configuration information and performing channel measurements.

In the embodiments of the present invention, the neighborhood-specific is defined as:
1. all UE in a neighborhood have the same configuration;
2. UE of different neighborhoods could have the same or different configurations. The configurations could accomplish independently in those neighborhoods. However, in consideration of factors such as system performances and so on, such a configuration could be carried out in reference to the configurations of other neighborhoods.

The present invention proposes a method for configuring and sending the downlink CSI reference signal in the LTE-A system, and achieves a flexible configuration of the downlink CSI reference signal according to operating requirements of the system, so that not only the pilot expense is reduced, but also an influence of the downlink CSI reference signal on a R8 user is reduced.

Whereas the embodiments of the present invention have been shown and described, for a person skilled in the art, it is to be understood that these embodiments can be subjected to various changes, modifications, replacements and deformations without departing from the principle and spirits of the present invention, and the scope of the present invention is limited by the appended claims and their equivalents.

The invention claimed is:

1. A method for configuring and sending a downlink CSI reference signal, comprising the following steps:
   an eNB configuring the downlink CSI reference signal and sending configuration information of the downlink CSI reference signal to a UE, wherein the configuration information comprises a starting subframe number and/or a cycle of the downlink CSI reference signal, and wherein the configuration information is sent with signalling which identifies the starting subframe number and the cycle of the downlink CSI reference signal, in a combined or separate manner; and
   the eNB sending the downlink CSI reference signal to the UE according to the configuration information of the downlink CSI reference signal, wherein the configurations of the cycle and the starting subframe number of the downlink CSI reference signal are prevented from interfering with PBCH/P-SCH/S-SCH channels.

2. The method of claim 1, characterized in that the eNB determines the cycle of the downlink CSI reference signal based on configurations of antenna ports and/or measurement requirements of the eNB.

3. The method of claim 1, characterized in that the cycle of the downlink CSI reference signal is configurable or constant.

4. The method of claim 1, characterized in that the starting subframe number of the downlink CSI reference signal is cell-specific.

5. The method of claim 1, characterized in that the starting subframe number of the downlink CSI reference signal is configurable or constant.

6. The method of claim 1, characterized in that the downlink CSI reference signal of all ports correspond to the same starting subframe number.

7. The method of claim 1, characterized in that the signalling comprises implicit signalling and/or explicit signalling.

8. A method for receiving and measuring, comprising:
   a UE receiving configuration information of a downlink CSI reference signal from an eNB, wherein the configuration information comprises a starting subframe number and/or a cycle of the downlink CSI reference signal, wherein the configuration information is sent with signalling which identifies the starting subframe number and the cycle of the downlink CSI reference signal, in a combined or separate manner, and wherein the configurations of the cycle and the starting subframe number of the downlink CSI reference signal have been prevented from interfering with PBCH/P-SCH/S-SCH channels; and the UE obtaining the downlink CSI reference signal according to the configuration information and performing channel measurements.

9. A device for configuring and sending, comprising a configuring module and a sending module, wherein the configuring module is configured for configuring a downlink CSI reference signal; and the sending module is configured for sending configuration information of the downlink CSI reference signal to a UE, wherein the configuration information comprises a starting subframe number and/or a cycle of the downlink CSI reference signal, wherein the configuration information is sent with signalling which identifies the starting subframe number and the cycle of the downlink CSI reference signal, in a combined or separate manner, and wherein the configurations of the cycle and the starting subframe number of the downlink CSI reference signal are prevented from interfering with PBCH/P-SCH/S-SCH channels.

10. The device of claim 9, characterized in that, the configuring module determines the cycle of the downlink CSI reference signal based on configurations of antenna ports and/or measurement requirements of an eNB.

11. The device of claim 9, characterized in that the cycle of the downlink CSI reference signal is configurable or constant.

12. The device of claim 9, characterized in that the starting subframe number of the downlink CSI reference signal is cell-specific.

13. The device of claim 12, characterized in that the starting subframe number of the downlink CSI reference signal is configurable or constant.

14. The device of claim 9, characterized in that the downlink CSI reference signal of all ports correspond to the same starting subframe number.

15. The device of claim 9, characterized in that the signalling comprises implicit signalling and/or explicit signalling.

16. A device for receiving and measuring, comprising a receiving module and a measuring module, wherein the receiving module is configured for receiving configuration information of a downlink CSI reference signal from an eNB, wherein the configuration information comprises a starting subframe number and/or a cycle of the downlink CSI reference signal, wherein the configuration information is sent with signalling which identifies the starting subframe number and the cycle of the downlink CSI reference signal, in a combined or separate manner, and wherein the configurations of the cycle and the starting subframe number of the downlink CSI reference signal have been prevented from interfering with PBCH/P-SCH/S-SCH channels; and the measuring module is configured for obtaining the downlink CSI reference signal according to the configuration information and performing channel measurements.

* * * * *